US009330279B2

(12) United States Patent
Filatov et al.

(10) Patent No.: US 9,330,279 B2
(45) Date of Patent: May 3, 2016

(54) SYSTEM AND METHOD FOR BLOCKING ELEMENTS OF APPLICATION INTERFACE

(71) Applicant: Kaspersky Lab, ZAO, Moscow (RU)

(72) Inventors: Konstantin M. Filatov, Moscow (RU); Victor V. Yablokov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 14/192,339

(22) Filed: Feb. 27, 2014

(65) Prior Publication Data
US 2015/0160813 A1 Jun. 11, 2015

(30) Foreign Application Priority Data
Dec. 5, 2013 (RU) ................................. 2013153762

(51) Int. Cl.
*G06F 21/62* (2013.01)
*G06F 21/10* (2013.01)
(52) U.S. Cl.
CPC .............. *G06F 21/629* (2013.01); *G06F 21/10* (2013.01)
(58) Field of Classification Search
CPC ........ G06F 21/00; G06F 21/56; G06F 21/566; G06F 21/629
USPC .......................................................... 715/741
See application file for complete search history.

(56) References Cited

U.S. PATENT DOCUMENTS

| 5,107,443 | A  | * | 4/1992  | Smith et al. ..................... 715/751 |
| 6,006,332 | A  |   | 12/1999 | Rabne et al. |
| 6,144,377 | A  | * | 11/2000 | Oppermann et al. ......... 715/744 |
| 6,717,589 | B1 | * | 4/2004  | Grillo et al. .................... 715/715 |
| 7,168,048 | B1 | * | 1/2007  | Goossen et al. ............... 715/797 |
| 7,240,360 | B1 | * | 7/2007  | Phan .................................. 726/2 |
| 7,533,345 | B2 | * | 5/2009  | Krebs ............................ 715/745 |
| 8,341,744 | B1 | * | 12/2012 | Obrecht .................. G06F 21/41 713/188 |
| 8,776,227 | B1 | * | 7/2014  | Glick ...................... G06F 12/14 726/23 |
| 8,904,538 | B1 | * | 12/2014 | Glick ...................... G06F 21/56 726/24 |

(Continued)

FOREIGN PATENT DOCUMENTS

GB     EP 2642718 A2 * 9/2013 .............. G06F 21/55
WO   WO2008048800     4/2008

OTHER PUBLICATIONS

IPCOM000177012D, "Method, system and apparatus for usage based filtering of elements of dialog-based user interfaces using local and central repositories", Dec. 3, 2008.*

(Continued)

*Primary Examiner* — Jennifer To
*Assistant Examiner* — Joseph R Burwell
(74) *Attorney, Agent, or Firm* — Bardmesser Law Group

(57) ABSTRACT

A method, system and computer program product for blocking access to restricted elements of application interface and covering the restricted elements by trusted interface elements. The system includes an analyzer module, a database of restricted elements and a blocking module. The analyzer module is configured to detect interface elements of an active application rendered on a computer or a mobile device. The analyzer module determines if an application interface element is restricted by comparing the application interface element against the known restricted interface elements from the database. If the restricted element is detected, the analyzer module sends the data about the restricted element to the blocking module. The blocking module covers the restricted interface element by a trusted interface element or by an image.

14 Claims, 4 Drawing Sheets

(56) References Cited

U.S. PATENT DOCUMENTS

| | | | |
|---|---|---|---|
| 8,910,064 B2 | 12/2014 | Shinomoto et al. | |
| 2002/0180792 A1 | 12/2002 | Broussard | |
| 2003/0217287 A1 | 11/2003 | Kruglenko | |
| 2004/0070612 A1 | 4/2004 | Sinclair et al. | |
| 2005/0065935 A1 | 3/2005 | Chebolu et al. | |
| 2007/0061723 A1* | 3/2007 | Ohga et al. | 715/705 |
| 2007/0204288 A1* | 8/2007 | Candelore | H04N 5/4401 725/28 |
| 2007/0283292 A1* | 12/2007 | Bucher et al. | 715/810 |
| 2008/0098229 A1* | 4/2008 | Hartrell | G06F 21/554 713/176 |
| 2008/0148235 A1 | 6/2008 | Foresti et al. | |
| 2008/0208579 A1* | 8/2008 | Weiss et al. | 704/244 |
| 2008/0244748 A1* | 10/2008 | Neystadt | H04L 63/1425 726/25 |
| 2009/0089663 A1* | 4/2009 | Rebstock et al. | 715/253 |
| 2009/0201535 A1 | 8/2009 | Nagao et al. | |
| 2010/0131868 A1* | 5/2010 | Chawla et al. | 715/759 |
| 2010/0180344 A1* | 7/2010 | Malyshev | G06F 21/566 726/23 |
| 2010/0185953 A1 | 7/2010 | Grandemenge | |
| 2011/0087990 A1 | 4/2011 | Ng et al. | |
| 2011/0239113 A1* | 9/2011 | Hung et al. | 715/271 |
| 2012/0011451 A1* | 1/2012 | Bansal et al. | 715/753 |
| 2012/0036452 A1* | 2/2012 | Coleman et al. | 715/751 |
| 2012/0144492 A1* | 6/2012 | Griffin | G06F 21/56 726/25 |
| 2012/0158956 A1 | 6/2012 | Sako | |
| 2012/0265663 A1 | 10/2012 | Youngren et al. | |
| 2012/0278895 A1* | 11/2012 | Morris | G06F 21/56 726/24 |
| 2012/0324359 A1* | 12/2012 | Lee et al. | 715/733 |
| 2013/0117102 A1* | 5/2013 | Barbieri et al. | 705/14.43 |
| 2013/0124285 A1* | 5/2013 | Pravetz et al. | 705/14.23 |
| 2013/0227394 A1* | 8/2013 | Sazhin et al. | 715/234 |
| 2013/0276105 A1* | 10/2013 | Hinchliffe | G06F 21/554 726/22 |
| 2014/0053262 A1* | 2/2014 | Sarangdhar | G06F 3/14 726/22 |
| 2014/0157160 A1* | 6/2014 | Cudak et al. | 715/766 |
| 2014/0325654 A1* | 10/2014 | Denis | G06F 21/567 726/24 |
| 2015/0058988 A1* | 2/2015 | Katz | H04L 63/145 726/23 |

OTHER PUBLICATIONS

IPCOM000199080D, "Method for augmenting the user interfaces of legacy applications", Aug. 25, 2010.*

IPCOM000199843D, "A method for limiting the features available to a user based on their estimated expertise", Sep. 17, 2010.*

Search Report in PCT/RU/2013/153762/08(084043), dated May 12, 2013.

* cited by examiner

SYSTEM AND METHOD FOR BLOCKING ELEMENTS OF APPLICATION INTERFACE

BACKGROUND OF THE INVENTION

1. Field of the Invention

The present invention is related to application interfaces and, in particular, to a method and system for blocking application interface elements based on certain restrictions.

2. Description of the Related Art

Modern applications are more complex than in the past, and the applications have complex user interfaces that reflect functionality of the application. A typical application interface has control elements: menus, command lines, buttons, labels, text boxes, lists, etc. implemented in a graphic form. A user has access to all visible interface elements and can trigger the corresponding application functions by I/O devices such as a keyboard, a mouse, a joystick, a touch screen feature, etc.

Typically, the interface elements reflect their functionality and properties, which makes it easier for a new user to work with the application. However, in some cases, certain application functionality needs to be restricted (or blocked). For example, in cases of parental control, certain application features or links need to be blocked due to unsuitable content. Game applications have in-game purchase options that may not be allowed by the parents. Parents may want to allow a child to use the game application, but do not allow him to spend real money on in-game purchases. In such cases there is no need to block the entire application.

Several conventional solutions exist for analyzing user interaction with the application through the application interface. Patent publication WO2012176365A1 discloses replacing one screen image with another one using an application interface generation module. The application interface is generated based on a set of attributes of the interface elements.

Patent publication US 20080148235A1 describes an algorithm for analyzing application interfaces and comparing them against the design specifications provided by the user. An interface analysis system determines if the interface elements are displayed correctly. However, the conventional solutions analyze user interaction with the application via the interface, but do not limit the access to certain interface elements.

Accordingly, a method for limiting access to the application interface is desired.

SUMMARY OF THE INVENTION

The present invention is related to application interfaces and, in particular, to a method and system for blocking application interface elements based on certain restrictions that substantially obviates one or several of the disadvantages of the related art.

The present invention provides a method, system and computer program product for blocking access to restricted elements of application interface and covering the restricted elements by trusted interface elements. The system includes an analyzer module, a database of restricted elements and a blocking module. The analyzer module is configured to detect interface elements of an active application rendered on a computer or a mobile device. The analyzer module determines if an application interface element is restricted by comparing the application interface element against the known restricted interface elements from the database. If the restricted element is detected, the analyzer module sends the data about the restricted element to the blocking module. The blocking module covers the restricted interface element by a trusted interface element or by an image.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
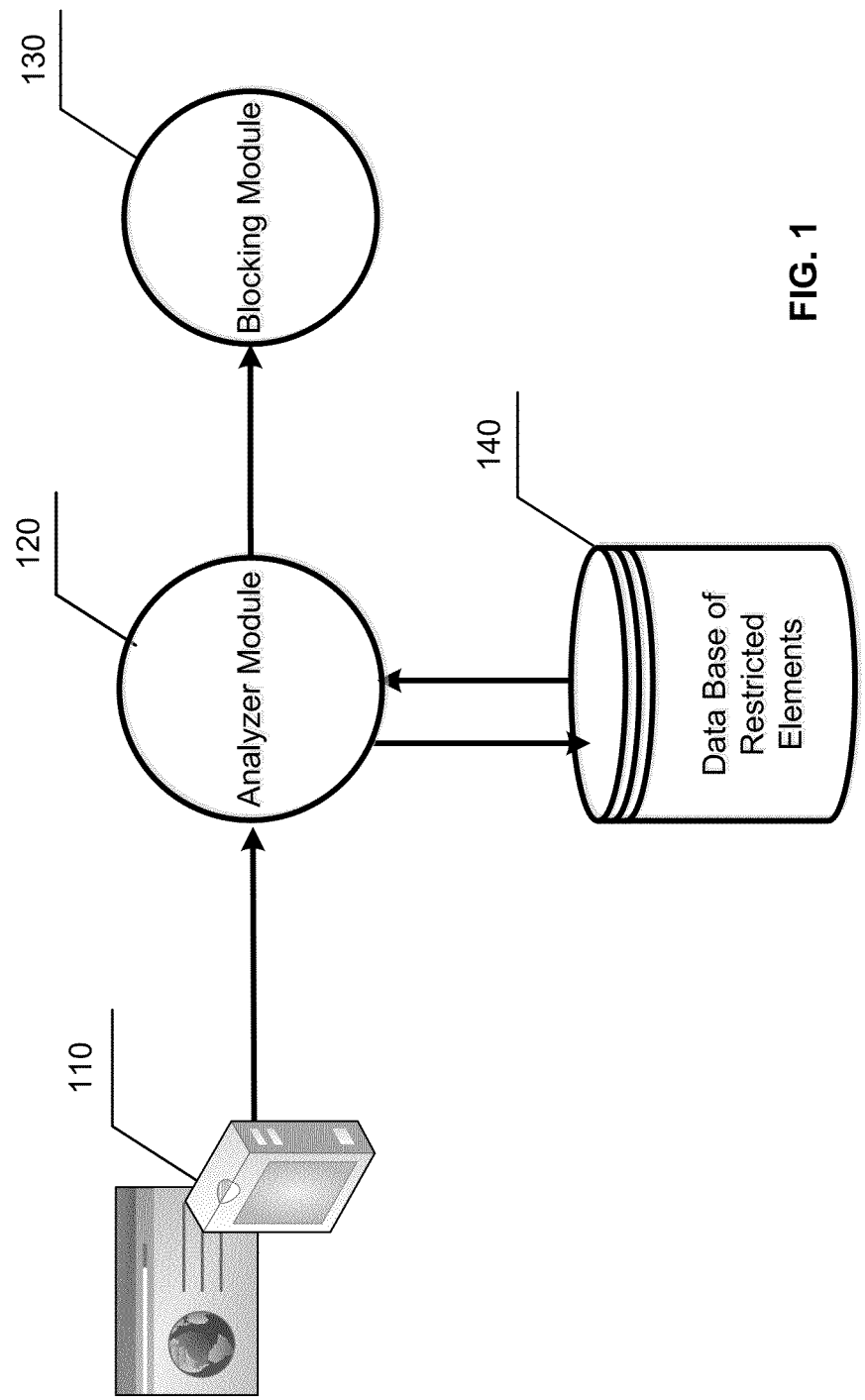
FIG. 1 illustrates an architecture of a system for blocking the application interface elements, in accordance with the exemplary embodiment.

Reference will now be made in detail to the preferred embodiments of the present invention, examples of which are illustrated in the accompanying drawings.

According to the exemplary embodiment, a method, system and computer program product for blocking application interface elements is provided. The application has the application interface (or GUI) with the interface elements providing access to the various functions of the application. An active application displays its interface as a foreground on a computer or a mobile device screen. The user interacts with the application via the application interface elements such as a window, a button, a scroll bar, a flag, a link, an icon, a menu, a checkbox, etc. The interface elements are treated as parts of a particular application. The elements can be generic or unique. The system includes an analyzer module, a database of restricted elements and a blocking module. The analyzer module is configured to detect interface elements of an active application rendered on a computer or a mobile device. The analyzer module determines if an application interface element is restricted by comparing the application interface element against the known restricted interface elements from the database. If the restricted element is detected, the analyzer module sends the data about the restricted element to the blocking module. The blocking module covers the restricted interface element by a trusted interface element or by an image.

According to an exemplary embodiment, if the interface contains some elements that trigger undesired actions, the elements are blocked by being covered by other (trusted) interface elements or by images. Note that the user may not be able to close the application with the undesired elements due to not having admin rights to close applications. This, advantageously, allows for running the application instead of terminating it because some undesired (restricted) elements are detected. The image or the trusted interface elements can be rendered using graphic functionality of a particular OS. An image or a trusted interface element is constantly displayed over the restricted interface element. The image can be, for example, a white or a black square of a size of the restricted element being covered. An exemplary code for generating such an image is as follows:

```
case WM_PAINT:
{
HDC hDC=::GetDC(NULL);
::Rectangle(hDC,500,500,600,600);
::ReleaseDC(NULL, hDC);
}
break;
```

According to the exemplary embodiment, the trusted interface element, which covers the restricted interface element, can belong to an anti-virus application. For example, the trusted element can be a window displaying a warning about the restricted element. The restricted elements can belong to a malware application. Clicking on these elements can result in infection of the computer system hosting the application. According to the exemplary embodiment these potentially malicious application elements are blocked by being covered by other trusted elements.

The undesired elements can be also covered by images of different color. Additionally, the elements can be covered by a similar (by shape and color) element with a different caption (i.e., for example, a button with an alternative caption or with no caption at all). Also, an identical button can be used with a different functionality. An "OK" button can perform closing of an application instead of agreeing to run some potentially malicious or unapproved components.

Other restricted elements are the elements that allow access to confidential or age-restricted data. The interface elements that allow for execution of payments can also be restricted. For example, an interface element can allow for sending an SMS or connecting to the Internet, which may result in additional charges. The restricted element can be determined based on a user feedback and analysis of logged user activities. The analysis can be performed by a user, as well as by the developers. The user can mark the elements of the interface that seem too suspicious, for example, exercising parental control. Then, these elements are analyzed for malware by developers.

According to the exemplary embodiment, the restricted elements are blocked by trusted elements or images that cover the restricted element. FIG. 1 illustrates an architecture of a system for blocking the application interface elements, in accordance with the exemplary embodiment. The system includes an analyzer module 120, a database of restricted elements 140 and a blocking module 130. The analyzer module 120 is configured to detect interface elements of an active application 110 rendered on a computer or a mobile device. The analyzer module 120 determines if an application interface element is restricted by comparing the application interface element against the known restricted interface elements from the database 140. The database 140 can be updated from the AV server or from a cloud. If a restricted element is detected, the analyzer module 120 sends the data about the restricted element to the blocking module 130. The blocking module 130 covers the restricted interface element by a trusted interface element or by an image. The trusted interface element can be selected based on configurations. If a user selects an image, the trusted image is used. If the user selects an interface element, the window with a password is displayed and the user can replace the element upon entering the password.

According to the exemplary embodiment, the interface element of the application 110 can be detected in a synchronous or asynchronous mode. In the synchronous mode, the analyzer module 120 detects the interface elements right after they are displayed by the application. In the asynchronous mode, the analyzer module 120 detects the interface elements with a delay. The display of the element can be detected based on a system log or by interception of the system messages. Alternatively, the analyzer module 120 can analyze the active windows. For example, Symbian platform has a class RwindowGroup, which has a method EnableFocusChangeEvents.

According to the exemplary embodiment, the blocking module is an application or a part of an anti-virus module. The covering of the restricted elements is implemented on a computer or a mobile device where the application is installed. The database of the restricted elements can be implemented on the cloud storage. According to one exemplary embodiment, the database of the known restricted interface elements 140 stores the samples of known restricted (undesirable) interface elements and parameters of the restricted elements. All interface elements have their IDs. The elements can be searched based on a combination of IDs, based on templates (i.e., a set of elements of a dialog window). For example, in MS Windows a set of identifiers can be a set of coordinates X, Y and parent HWND. Example of a template is a window of certain kind with a certain number of elements.

The analyzer module 120 compares the samples and parameters of the interface element against the known restricted elements from the database 140. For example, the main parameter for comparison can be an identifier (i.e., an alphanumeric value) of the interface window and the dialog window can be used as a comparison element.

According to another exemplary embodiment, the restricted elements can be determined by content analysis of the interface elements. The content analysis can reveal links to adult materials or to confidential data. The content analysis of the images can detect adult content or restricted data. The database 140 can be implemented as a hierarchical database (e.g., IMS, TDMS, System 2000), network-based storages (e.g., Cerebrum, Cronospro, DBVist), relational databases (e.g., DB2, Informix, Microsoft SQL Server), object-oriented databases (e.g., Jasmine, Versant, POET), object-relational databases (e.g., Oracle Database, PostgreSQL, FirstSQL/J, functional, etc.).

According to one exemplary embodiment, the analysis module 120 can detect certain user actions on application interface elements. The user actions can be a mouse click (left or right), pressing key on a keyboard, pressing certain key simultaneously, or pressing the keys in a certain order. In this case, the database 140 contains samples and templates of known restricted user actions. The analyzer module 120 detects user actions on interface elements and compares the user actions against the restricted user actions from the database 140.

If a restricted user action is detected, the analyzer module 120 provides the related data to the blocking module 130. Examples of the restricted user actions are a launch of an application that belongs to a certain category (e.g., a known malware application). Some user actions can be aggregated into groups. The main group is the user actions directed to launch of an application by a double click on the application icon on the desktop or mobile device screen, by a click on a link, by pressing of an "Enter" key, combination of keys, by left mouse click on a context menu "open" and a subsequent right mouse click, etc. Entering a path to the executable application file in the console can also launch the application. In the Android OS, the restricted actions are the corresponding touch screen actions that trigger a launch of an application.

A second component of a restricted action is the actual interface element subject to a user action. Pressing on a certain button (e.g., a "Send" button) can be restricted. Other elements can be a line of a context menu, a flag, etc. A third component of the restricted action is the reason why the action is undesirable. The action can be considered restricted based on the reputation of the interface element. For example, if the element is an icon of an application belonging to a restricted category, a double click on the icon must be restricted.

The restricted element can be a button that opens a window restricted for viewing. An example of such a window is a form for entering credit card data and other payment-related data. Another reason for restricting an action is importance of the data that the action may access. Thus, for example, any actions that open text files can be restricted. Another reason for restricting a user action can be an action that is unusual for a particular user. A user can define a set of actions that identify him.

For example, in Android OS, the user can have a following set of actions: unblocking of the screen, activation of a top fold-down menu, switching off vibration, turning on vibration. A user who performs these actions can use all features of the installed applications. However, if an intruder obtains a mobile device password but does not perform a set of required actions in a particular order that uniquely identify the user, the application's interface elements that expose the user's personal data are blocked. Additionally, the mobile device can send a message (e.g., an email) notifying the user of an attempt of unauthorized access to the user's personal data.

According to the exemplary embodiment, a sequence of user actions on the interface elements can be analyzed as a script and the actions can be restricted. The user action script can contain several moves from one interface element to another. The actions script can be generated by the OS. Detection of malicious actions can be performed automatically or in a manual mode. In an automated mode, a depth of four actions can be used. The system forms a set of four actions, where the last one is the undesired one. In the manual mode, the user can mark the sequence of actions that produce undesired event and report it to the AV module.

For example, if an interface window has a "next" button, the use of the action script can be effective when restricted interface elements are used after several jumps to the next window. The action script is considered retractable if its execution will result in displaying of the restricted interface. If the user actions follow a restricted script, the interface elements involved are blocked.

The blocking module 130 covers a restricted element by a trusted interface element or by an image. The trusted element can be selected based on configurations. If a user has a permission to unblock the elements, the restricted element is covered by the trusted element that can be unblocked (removed) if necessary. For example, the button confirming a purchase can have a dialog window with a password used to unblock this button (see FIG. 3). In cases when a trusted interface element cannot be used due to size restrictions of the undesired element, this element can be covered by an image of a required size.

If a user decides to work with the application with the restricted element, the restricted element is blocked again. According to the exemplary embodiment, the blocking of the interface element can be temporary. For example, limited access to game applications can be lifted for child's free time period and imposed again at other times.

The system for blocking the interface elements is particularly effective in an environment where all applications have the same level of privileges (e.g., Android OS, MS Windows, Symbian, Tizen, iOS, Linux, etc.). The OS Android keeps a system log (Logcat) of all applications that allows for detection of displayed interface elements. If a trusted application is launched, the system connects to the system log. The system log is populated during the user interactions with the application. The content of the system log is analyzed. Especially, all the records related to an Activity Manager are scanned. The Activity Manager is a component of the Android OS, which is responsible for switching between application interface elements and for controlling the application life cycle. If a record marked "activitymanager" begins with "starting" or "displayed," this means that the user can see the application interface elements. The record also indicates a name of the application package, which is displayed on the screen.

The system periodically checks which application is active on the screen:

final ActivityManager am=(ActivityManager) mContext.getS ystemService(Service.ACTIVITY_SER-VICE);

final List<ActivityManager.RunningTaskInfo> tasks= am.getRunningTasks(1);

final ActivityManager.RunningTaskInfo task=tasks.get (0);

final String pkgName=task.topActivity.getPackage-Name( );

task.topActivity where task.topActivity—is an interface element, which is currently displayed on the screen; pkgName—is a name of the application package currently displayed on the screen.

Figure 2:
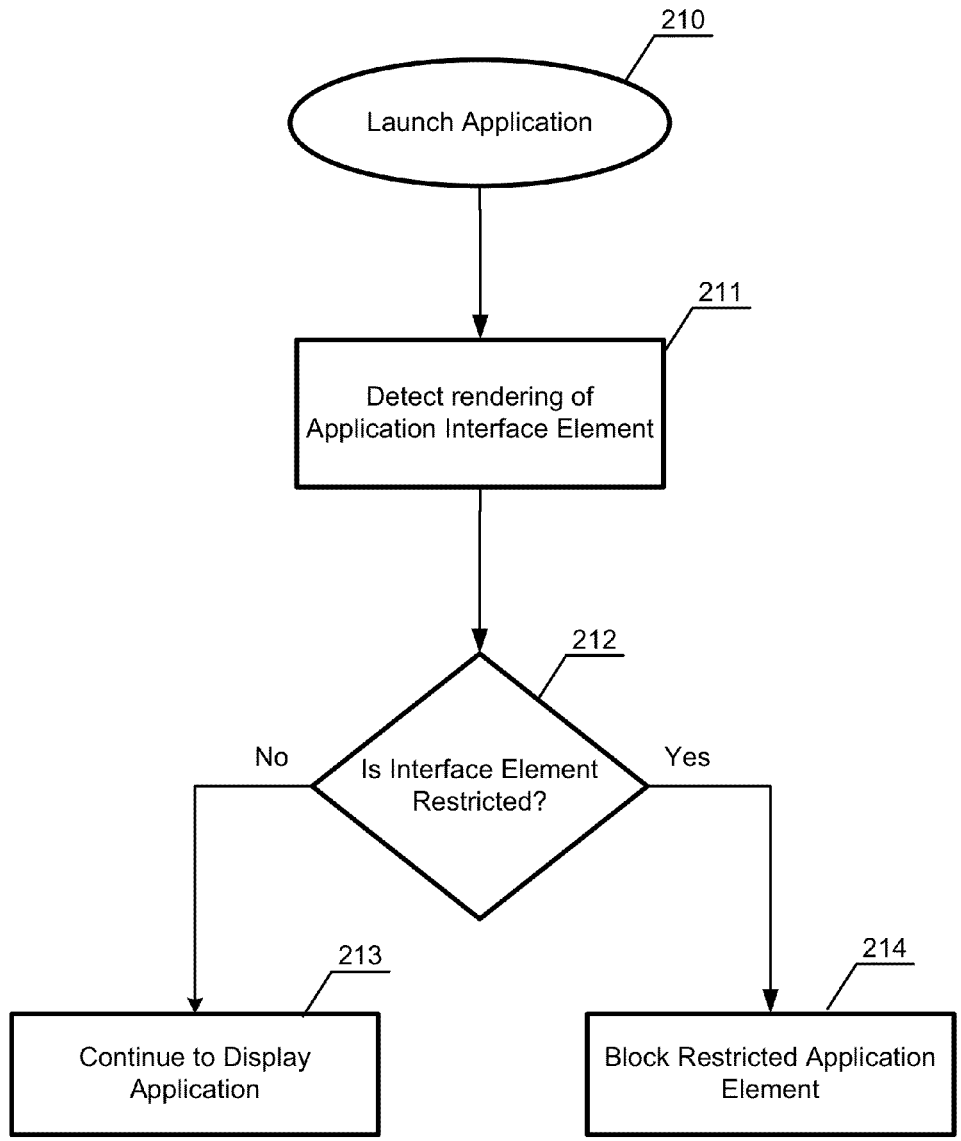
FIG. 2 illustrates an algorithm for blocking the application interface elements, in accordance with the exemplary embodiment.

According to the exemplary embodiment, in order to detect restricted interface elements, black lists of application packages and interface elements can be used. The system can employ a black list of interface elements to determine the application interface elements that need to be blocked, or can employ a black list of application packages to determine the application interface elements that needs to be blocked. In this case, the displayed interface elements are compared against the interface elements from the black list. FIG. 2 illustrates an algorithm for blocking the application interface elements, in accordance with the exemplary embodiment. In step 210 an active application renders at least one interface element of application 110 (FIG. 1). In step 211 the analyzer 120 detects the rendered interface element of the application 110. In step 212 the analyzer 120 determines if the interface element is restricted by comparing the element against known restricted elements from the database 140. If the interface element is deemed to be not restricted, the user continues to work with the application in step 213. In step 214, if the restricted element is detected, the analyzer module 120 sends a notification to the blocking module 130, which blocks the restricted element by covering it with a trusted element or by an image.

Figure 3:
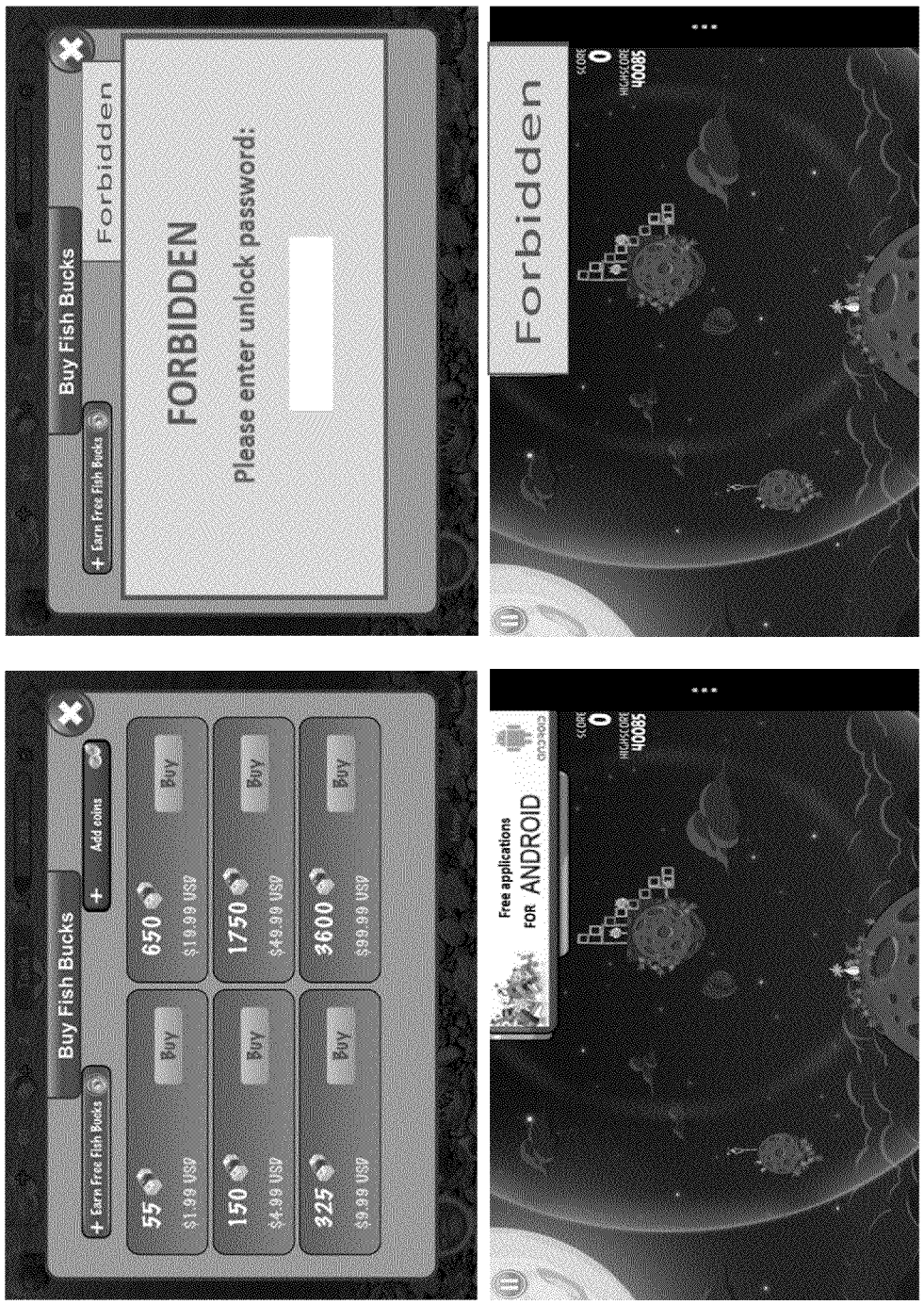
FIG. 3 illustrates a screen shot depicting blocking the restricted interface elements, in accordance with the exemplary embodiment.

FIG. 3 illustrates a screen shot depicting blocking the restricted interface elements, in accordance with the exemplary embodiment. FIG. 3 illustrates the two exemplary cases of blocking the application interface elements. In a first example (top two screen shots) the application offers to buy in-game money or tokens using the real money. There are six interface elements that can cause a loss of money. These elements are covered by another element, which allows for unblocking the game interface elements.

In a second example (two bottom screen shots) a user is offered to use a link to a supposedly free application for Android OS, e.g., for downloading it. After the link revealed a malicious application, the interface element was blocked by an image with a "Forbidden" label.

Figure 4:
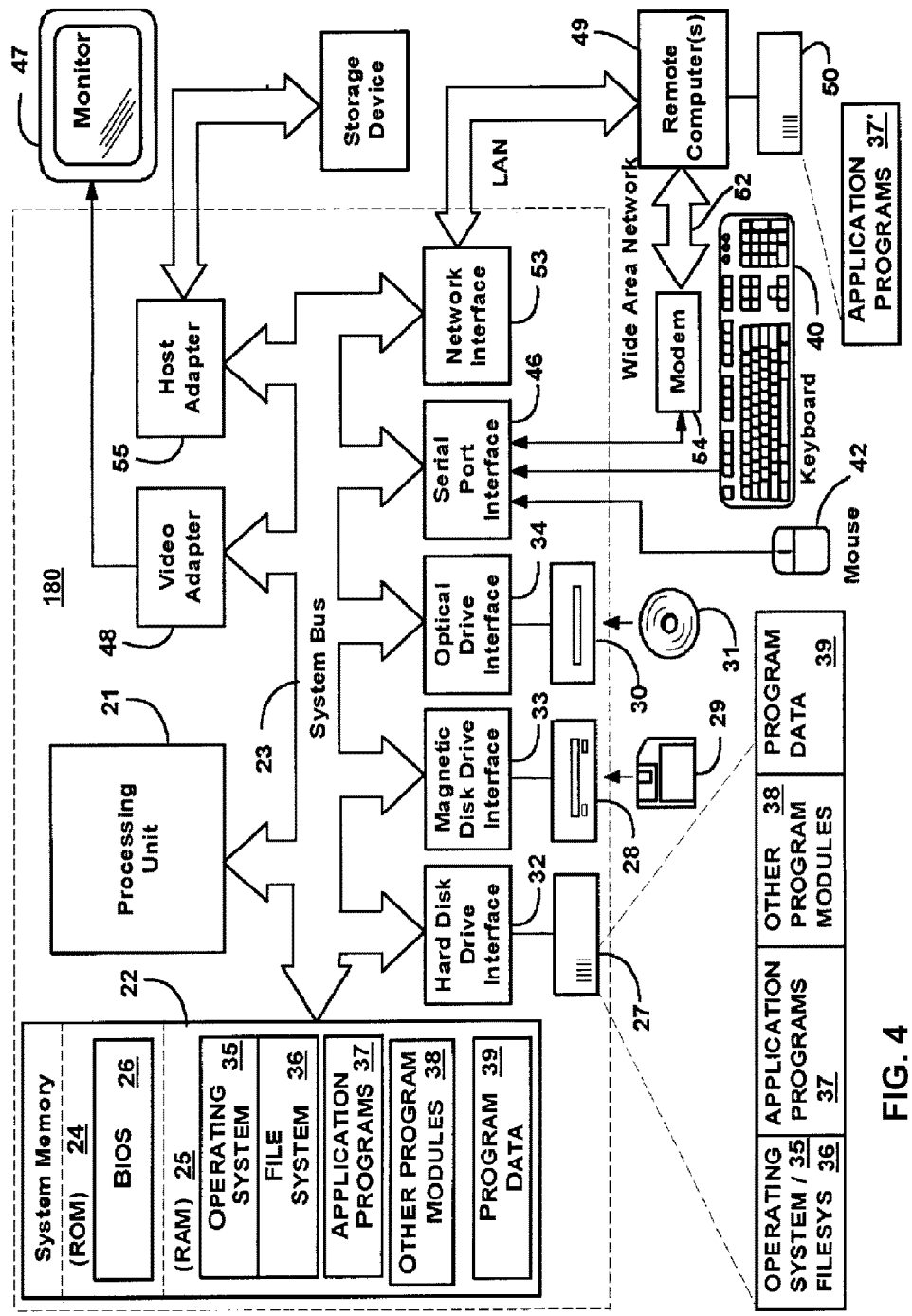
FIG. 4 illustrates a schematic of an exemplary computer system or a server that can be used for implementation of the invention.

With reference to FIG. 4, an exemplary system for implementing the invention includes a general purpose computing device in the form of a computer system/administration server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for efficient blocking of restricted application interface elements without blocking the entire application.

It should also be appreciated that various modifications, adaptations and alternative embodiments thereof may be made within the scope and spirit of the present invention. The invention is further defined by the following claims.

What is claimed is:

1. A computer-implemented system for blocking application interface elements, the system comprising:
   a processor;
   a memory coupled to the processor;
   an application stored in the memory and running on the processor;
   an analysis module stored in the memory and executed on the processor, the analysis module configured to analyze an interface element of the application and determine interface elements that need to be blocked based on (i) a system log, (ii) a category of the application, including whether the application belongs to known or suspected malware, (iii) analysis of active windows, and (iv) reputation of the interface elements, including the category of the application to which the interface elements belong;
   a database stored in the memory, the database storing restricted application interface elements accessible by the analysis module and identified as the restricted application interface elements prior to the application being launched,
   wherein the restricted application interface elements permit interaction from a user and are first rendered by the application prior to being blocked; and
   a blocking module configured to block the application interface elements by overlaying the application interface element with another trusted application interface element in real time after the application attempts to render the restricted application interface elements,
wherein the analysis module acquires data from the application and from the database for selecting the application interface elements to be overlaid.

2. The system of claim 1, wherein the blocking module is configured to block the application interface elements by overlaying the application interface element with an image.

3. The system of claim 1, wherein the blocking module blocks a dialog window by drawing an image over it.

4. The system of claim 3, wherein the dialog window can be unblocked upon user request.

5. A computer-implemented method for blocking application interface elements, the method comprising:
    launching an application on a computer system;
    detecting application interface elements;
    connecting to a database of restricted application interface elements;
    comparing the detected application interface elements against the database of restricted application interface elements, wherein the database is populated with the restricted application interface elements prior to the application being launched,
    wherein the restricted application interface elements permit interaction from a user and are first rendered by the application prior to being blocked;
    determining the application interface elements to be blocked, if the application interface elements match the restricted application interface elements from the database and based on (i) a system log, (ii) a category of the application, including whether the application belongs to known or suspected malware, (iii) analysis of active windows, and (iv) reputation of the interface elements, including the category of the application to which the interface elements belong; and
    blocking the application interface elements by overlaying them with trusted interface elements in real time after the application attempts to render the restricted application interface elements.

6. The method of claim 5, further comprising blocking the interface elements by overlaying them with images.

7. The method of claim 5, further comprising unblocking the interface elements upon a user request.

8. The method of claim 5, further comprising periodically checking which active application is rendered to a user.

9. The method of claim 5, further comprising:
    detecting user actions on the application interface elements;
    analyzing the user actions; and
    blocking the application interface elements, if the user actions match a restricted user action from the database.

10. The method of claim 5, wherein the detecting of the application interface elements is performed in a synchronous mode.

11. The method of claim 5, wherein the detecting of the application interface elements is performed in an asynchronous mode.

12. The method of claim 5, further comprising employing a black list of interface elements for determining the application interface elements to be blocked.

13. The method of claim 5, further comprising employing a black list of application packages for determining the application interface elements to be blocked.

14. A system for blocking application interface elements, the system comprising:
    a processor;
    a memory coupled to the processor, a computer program logic stored in the memory and executed on the processor, the computer program logic is configured to execute the steps of:
    launching an application on a computer system;
    detecting application interface elements;
    connecting to a database of restricted application interface elements;
    comparing the detected application interface elements against the database of restricted application interface elements, wherein the database is populated with the restricted application interface elements prior to the application being launched, wherein the restricted application interface elements permit interaction from a user and are first rendered by the application prior to being blocked;
    determining the application interface elements to be blocked, if the application interface elements match the restricted application interface elements from the database and based on (i) a system log, (ii) a category of the application, including whether the application belongs to known or suspected malware, (iii) analysis of active windows, and (iv) reputation of the interface elements, including the category of the application to which the interface elements belong; and
    blocking the application interface elements by overlaying them with trusted interface elements in real time after the application attempts to render the restricted application interface elements.

* * * * *